United States Patent Office 3,187,024
Patented June 1, 1965

3,187,024
3-(ω-HALOALKOXY)-ESTRA-1,3,5(10)-TRIEN-17-ONE COMPOUNDS
David Darwin Evans, Staines, Middlesex, David Eurof Evans, Surrey, and Peter John Palmer, Twickenham, Middlesex, England, assignors to Parke, Davis & Company, Detroit, Mich., a corporation of Michigan
No Drawing. Filed Jan. 15, 1964, Ser. No. 337,740
Claims priority, application Great Britain, Jan. 17, 1963, 2,199/63
3 Claims. (Cl. 260—397.4)

The present invention relates to novel haloalkyloxysteroid compounds and to methods for their production. More particularly, the invention relates to 3-(ω-haloalkoxy)-estra-1,3,5(10)-trien-17-one compounds, having the formula

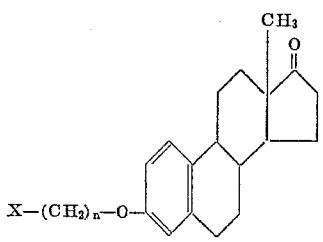

where $n$ is a positive integer greater than 1 and less than 11 and X represents a halogen atom. Preferred halogen atoms are bromine and chlorine.

In accordance with the invention, compounds of the above formula are produced by reacting estrone with α,ω-dihaloalkane in the presence of base. The reaction is preferably carried out in an alcoholic solvent, such as, for example, ethanol, n-propanol, isopropanol and the like. Bases preferred for use in the reaction are the alkali metal hydroxides. The temperature of the reaction may be varied over a wide range from room temperature to the boiling point of the solvent employed. A preferred method is to heat the reaction mixture at the reflux temperature for a period of several hours duration. Equimolar amounts of reactants may be used; it is preferred, however, to employ a 5 to 10-fold molar excess of α,ω-dihaloalkane.

The compounds of the invention are useful as pharmacological agents, having hormonal activity, and as chemical intermediates. They are anti-fertility agents that exhibit a low degree of estrogenicity. They are active upon oral administration. As chemical intermediates, they are converted upon reaction with organic amines into the corresponding aminoalkoxysteroids.

The invention is illustrated by the following examples:

Example 1

A solution of 13.5 g. of estrone in a mixture of 150 ml. of ethanol and 10 ml. of 5 N aqueous potassium hydroxide is added, over a period 2–3 hours, to a refluxing solution of 101 g. of 1,3-dibromopropane in 150 ml. of ethanol. After refluxing for an additional period of 1–2 hours, the reaction mixture is allowed to cool, is poured into water, and the product is extracted with benzene. The benzene solution is washed with water until neutral, and subjected to steam distillation to remove the unreacted steam-volatile 1,3-dibromopropane. The non-volatile residue is extracted once again with benzene, the benzene solution is washed first with a solution of 35 g. of potassium hydroxide in a mixture of 25 ml. of water and 100 ml. of methanol, then with water until neutral. After drying over anhydrous magnesium sulfate, the benzene solution is evaporated to dryness and the 3-(γ-bromo-n-propoxy)-estra-1,3,5(10)-trien-17-one so obtained is recrystallized from methanol; M.P. 99–101° C.

By employing the above procedure, 1,3-dichloropropane may be substituted for 1,3-dibromopropane to prepare 3-(γ-chloro-n-propoxy)-estra-1,3,5(10)-trien-17-one.

Also by employing the above procedure, ethylene dibromide may be substituted for 1,3-dibromopropane to prepare 3-(β-bromoethoxy)-estra-1,3,5(10)-trien-17-one.

Example 2

A solution of 13.5 g. of estrone in a mixture of 350 ml. of ethanol and 10 ml. of 5 N potassium hydroxide is added, over a period of 90 minutes, to a refluxing solution of 63.5 g. of 1,4-dichlorobutane in 350 ml. of ethanol. After refluxing for an additional 45-minute period, the solvent is removed to near-dryness, the residue is diluted with water, and the precipitated solid is isolated by filtration. The solid is dissolved in 750 ml. of a 1:1 mixture of benzene and ether, and the solution is washed first with 250 ml. of a solution prepared by dissolving 70 g. of potassium hydroxide in a mixture of 50 ml. of water and 200 ml. of methanol, then with water until neutral. After drying over anhydrous magnesium sulfate, the solution is evaporated to dryness and the 3-(ω-chloro-n-butoxy)-estra-1,3,5(10)-trien-17-one obtained is recrystallized from acetone; M.P. 120–122° C.

Example 3

A solution of 13.5 g. of estrone in a mixture of 150 ml. of ethanol and 10 ml. of 5 N potassium hydroxide is added, over a period of 2–3 hours, to a refluxing solution of 115 g. of 1,5-dibromopentane in 150 ml. of ethanol. After refluxing for an additional period of 1–2 hours, the reaction mixture is allowed to cool, is poured into water, and the product is extracted with benzene. The benzene solution is washed with water until neutral, and subjected to steam distillation to remove the unreacted steam-volatile 1,5-dibromopentane. The non-volatile residue is extracted once again with benzene, the benzene solution is washed first with a solution of 35 g. of potassium hydroxide in a mixture of 25 ml. of water and 100 ml. of methanol, then with water until neutral. After drying over anhydrous magnesium sulfate, the benzene solution is evaporated to dryness and the 3-(ω-bromo-n-pentyloxy)-estra-1,3,5(10)-trien-17-one obtained is recrystallized from ethanol-ether; M.P. 84–86° C.

Example 4

A solution of 13.5 g. of estrone in a mixture of 150 ml. of ethanol and 10 ml. of 5 N potassium hydroxide is added, over a period of 2–3 hours, to a refluxing solution of 122 g. of 1,6-dibromohexane in 250 ml. of ethanol. After refluxing for an additional period of 2–3 hours, the reaction mixture is allowed to cool, is poured into water, and the product is extracted with benzene. The benzene solution is washed with water until neutral, and subjected to steam distillation to remove the unreacted steam-volatile 1,6-dibromohexane. The non-volatile residue is extracted once again with benzene, the benzene solution is washed first with a solution of 35 g. of potassium hydroxide in a mixture of 25 ml. of water and 100 ml. of methanol, then with water until neutral. After drying over anhydrous magnesium sulfate, the benzene solution is evaporated to dryness and the 3-(ω-bromo-n-hexyloxy)-estra - 1,3,5(10) - trien-17-one obtained is recrystallized from n-hexane; M.P. 74.5–76.5° C.

*Example 5*

A solution of 13.5 g. of estrone in a mixture of 150 ml. of ethanol and 10 ml. of 5 N potassium hydroxide is added, over a period of 2–3 hours, to a refluxing solution of 67.5 g. of 1,10-dibromodecane in 150 ml. of ethanol. After refluxing for an additional period of 2–3 hours, the solvent is removed to near-dryness, the residue is diluted with water, and the oil obtained is isolated and dissolved in benzene. The benzene solution is washed first with a solution of 35 g. of potassium hydroxide in a mixture of 25 ml. of water and 100 ml. of methanol, then with water until neutral. After drying over anhydrous magnesium sulfate, the solution is evaporated to dryness, and the 3-(ω - bromo - n-decyloxy)-estra-1,3,5(10)-trien-17-one obtained is purified by chromatography and recrystallized from n-hexane; M.P. 66–68° C.

We claim:
1. 3 - (ω-haloalkoxy)-estra-1,3,5(10)-trien-17-one compounds, having the formula

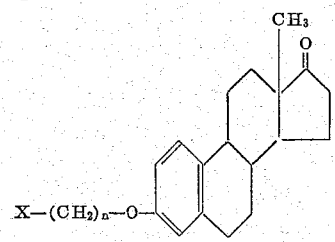

where $n$ is a positive integer greater than 1 and less than 11, and X is a member of the class consisting of chlorine and bromine atoms.
2. 3 - (γ - bromo-n-propoxy)-estra-1,3,5(10)-trien-17-one.
3. 3-(ω-chloro-n-butoxy)-estra-1,3,5(10)-trien-17-one.

References Cited by the Examiner
UNITED STATES PATENTS
2,774,777  12/56  Djerassi et al. _____ 260—397.4

OTHER REFERENCES

Blickenstaff: "J. Amer. Chem. Soc.," vol. 82, July 20, 1960, pp. 3673–3676.

LEWIS GOTTS, *Primary Examiner.*